United States Patent Office 3,803,204
Patented Apr. 9, 1974

3,803,204
PREPARATION OF AROMATIC NITRILES
Robert K. Grasselli, Chagrin Falls, and James L. Callahan, Bedford Heights, Ohio, assignors to The Standard Oil Company, Cleveland, Ohio
No Drawing. Filed Mar. 27, 1972, Ser. No. 238,520
Int. Cl. C07c 121/02
U.S. Cl. 260—465 C                       12 Claims

ABSTRACT OF THE DISCLOSURE

Aromatic nitriles are prepared by reacting the corresponding methyl-substituted aromatic compound with molecular oxygen or oxygen supplied by the catalyst and ammonia in the presence of a catalyst containing at least iron, bismuth and molybdenum. High yields of the aromatic nitrile are obtained.

BACKGROUND OF THE INVENTION

The preparation of aromatic nitriles from the corresponding methyl-substituted aromatic compound is known, see for example German Pats. 1,279,012 and 2,123,836. These patents, however, do not show systems which give high yields of aromatic nitriles.

The catalysts employed in the present invention are known for other ammoxidation reactions, see for example U.S. Pats. 3,226,422, 3,576,764 and 3,642,930. The application of these catalysts to different reactions does not make the special desirability of these catalysts to the ammoxidation of methyl-substituted aromatic compounds known or obvious.

SUMMARY OF THE INVENTION

It has now been discovered according to the present invention that very desirable yields of aromatic nitriles and heterocyclic aromatic nitriles are produced in the ammoxidation of methyl-substituted aromatic compounds with molecular oxygen or oxygen supplied by the catalyst and ammonia at a temperature of about 300° to 500° C. in the presence of a catalyst containing

wherein

Q is an alkali metal, an alkaline earth metal, thallium, or mixture thereof,
R is boron, phosphorus, arsenic, antimony, tungsten or mixture thereof,
wherein $a$ and $b$ are numbers from about 0.1 to about 12,
$c$ is a number from about 8 to about 16,
$d$, $e$ and $f$ are numbers from 0 to about 10,
$g$ is a number of 0 to about 6, and
$x$ is a number which satisfies the valence requirements of the other elements.

The very high yields of aromatic nitriles make the process of the present invention substantially superior to any known process for conducting this reaction.

The important aspect of the present invention is the catalyst employed, as noted, the catalyst may be any catalyst which contains active ingredients delimited by the formula above.

Preferred catalysts in the present invention are those which contain at least some nickel, cobalt or alkali metal or alkaline earth metal. Thus, in the formula of the catalysts, preferred compositions are denominated when $d$, $e$ and $f$ are independently given a value of about 0.1 to about 10. Of course, especially preferred in the present invention are catalysts wherein $d$, $e$ and $f$ are about 0.1 to about 10.

Also preferred are catalysts which contain an alkali metal. In the formula, then, Q is an alkali metal under this limitation and $f$ is a number of about 0.01 to about 3. Preferred alkali metals are sodium and potassium. In addition to these preferred species, those catalysts containing phosphorus within the range where $g$ is about 0.1 to about 3 are especially preferred.

The catalysts of the present invention may contain additional elements as active ingredients. For example, other elements such as tellurium, zinc, manganese, copper, uranium, tin and the like can be incorporated into the catalyst composition of the present invention to obtain a very desirable catalyst for the preparation of aromatic nitriles.

In addition to the ingredients of the catalysts which are considered active components, the catalysts of the invention suitably contain additional materials, such as supports. Accordingly, the catalysts may be supported on materials which include silica, titania, zirconia, alumina, boron phosphate, aluminum phosphate, antimony phosphate, pumice and the like. The use of silica support is preferred.

The catalysts of the present invention are prepared by known techniques. These preparations are more fully described in the patents cited in the background of the invention.

Although the important aspect of the process of the present invention is the catalyst, other factors in the process have a bearing on the results obtained. These factors, such as the reactants and reactant ratios, process conditions and reactor design, are described in the art. Generally, the techniques employed in the art are also applicable to the present invention. In spite of this disclosure in the art, the preferred limitations on these parameters will be briefly discussed below.

The methyl-substituted aromatic and heterocyclic aromatic compounds which can be used as the reactants include any methyl-substituted aromatic compound that contains up to about 20 carbon atoms and that can be vaporized at the reaction temperature.

Representative examples of these compounds include: aromatic carbocyclic compounds, such as toluene, o, m and p-xylene, 1,3,5-trimethylbenzene, methylbiphenyl, methylnaphthalene, di, tri and tetramethylnaphthalene, the methylanthracenes and methyl-phenanthrenes; heterocyclic methyl-substituted aromatic compounds, such as 2, 3 or 4-picoline, and the various lutidines, methyl pyrroles, methylquinolines and isoquinolines, methylthiophenes and methyl oxazoles; and any of these aromatic compounds containing substituents which do not adversely affect the reaction of the present invention.

Of the aromatic compounds suitable for use in the present invention, carbocyclic aromatics are preferred. Of special interest in the present invention are the reactions of methyl-substituted benzenes, with the reactions of toluene and the xylenes being of greatest interest because of their commercial significance and the proven high yields.

The reactant ratios may vary widely and are dependent upon the aromatic compound reacted. For example, when the more than one methyl group is to be converted to a nitrile group, the reactant proportions are different than when only one group is converted.

When only one methyl group is to be reacted, the ratios of the molecular oxygen in the form of air is suitably about 8 to about 20 moles per mole of aromatic compound. The ratio of ammonia is about 0.9 to about 4 moles of ammonia per mole of aromatic. When more than one methyl group is reacted, additional molecular oxygen and ammonia, of course, are required.

As an alternative to using molecular oxygen, the catalysts of the invention can be used as the source of oxygen in an oxidant reaction. The catalyst can be oxidized in one zone with air or other oxidizing agent and then transferred to a second zone where the catalyst is contacted with the aromatic reactant and ammonia to form the aromatic nitrile.

In addition to the necessary reactants of an aromatic compound, molecular oxygen and ammonia, other materials may be added to the reactant stream. For example, it has been found that the addition of certain amounts of water to the stream appears to have a beneficial effect on the reaction.

Another important variable in the reaction is the temperature. The temperature of the reaction is preferably about 300° to about 500° C. The optimum temperature, however, is generally dependent on other variables in the system, such as the aromatic compound employed.

The other process conditions are not critical. The reaction may be conducted at atmospheric, subatmospheric or superatmospheric pressure. The contact time may vary widely, but contact times of between about 0.5 and about 20 seconds normally give desirable results.

The reaction may be conducted in essentially any reactor which is capable of accommodating a catalytic gas phase reaction. Suitable reactors include both fixed-bed and fluid-bed designs. Using either design, the very desirable results of the invention are obtained.

SPECIFIC EMBODIMENTS

Example 1.—Preparation of p-toluonitrile

In the manner described by U.S. 3,642,930, Example 1, a catalyst having the composition 82.5%

$$K_{0.07}Ni_{2.5}Co_{4.5}Fe_3BiP_{0.5}Mo_{12}O_x$$

and 17.5% $SiO_2$ was prepared. The catalyst was charged to a 5 cc. fixed-bed reactor. The reactor and catalyst was brought to a temperature of 420° C., and a feed containing xylene:air:ammonia:water in the ratio of 1:15:2:10 was passed over the catalyst to give a contact time of 6 seconds. The reactor effluent was collected and the results were computed. The per pass conversion is defined as the moles of nitrile product formed per mole of xylene fed multiplied by 100. The selectivity is defined as the moles of nitrile product formed per mole of xylene reacted multiplied by 100.

At a contact time of 6 seconds, a per pass conversion to p-toluonitrile was 66.7%, and the per pass conversion to terephthalonitrile was 13.0% for a total per pass conversion of 79.7%. The selectivity to the mononitrile was 77%, and the selectivity to the dinitrile was 18% for a total selectivity to both nitriles of 95%.

When the contact time was reduced to 3 seconds, the per pass conversion to p-toluonitrile was 51.8%, and the per pass conversion to terephthalonitrile was 11.6% for a total of 62.6% per pass conversion. The selectivity was 80% to the mononitrile and 18% to the dinitrile for a total of 98% selectivity.

Example 2.—Preparation of 6-toluonitrile

Using the catalyst and reactor of Example 1, o-xylene was reacted at 420° C. and a contact time of 6 seconds. The per pass conversion to o-toluonitrile was 57.8% and only a trace of dinitrile was found. The selectivity was 89%.

When the contact time was increased to 9 seconds, the per pass conversion to o-toluonitrile was 45.2%, and the conversion to isophthalonitrile was 1.1%. The selectivity was 84% and 2% respectively.

Example 3.—Preparation of benzonitrile

Using the reactor and catalyst of Example 1, toluene was reacted instead of xylene. At a temperature of 450° C., and a contact time of 6 seconds, the per pass conversion to benzonitrile was 52.6%. The selectivity was 94%.

When the contact time was increased to 9 seconds, the per pass conversion was 68.7%, and the selectivity was 82%.

In the same manner as shown by the examples above, 1-methylnaphthalene, 4-picoline, 3,5-lutidine, 2-methylthiophene and 3,5,6-trimethylquinoline are reacted in the presence of the catalyst above, and the corresponding nitrile is obtained in good yield.

Also, in the same manner as shown by the examples above, other catalysts, such as $Fe_{4.5}Bi_{4.5}PMo_{12}O_x$,
$Mg_{4.5}Fe_4Bi_2P_{0.5}Mo_{12}O_x$,
$K_{0.1}Ni_{2.5}Co_{4.5}Sb_3FeTeBi_{0.1}Mo_{12}O_x$,
$Ni_3Co_6Fe_3Bi_2Mo_{12}O_x$,
$NaCo_2Ni_3CuFe_2Bi_3Mo_{12}O_x$,
$Fe_3U_2Bi_2Mo_{12}O_x$,
$K_{0.1}Mg_7NiFe_3BiP_{0.5}Mo_{12}O_x$,
$Tl_{0.2}Ni_6Zn_3Fe_2BiP_{0.25}Mo_{12}O_x$,
$K_{0.2}Ni_3Co_5Fe_2BiP_{0.5}W_2Mo_{10}O_x$, and
$Ca_2Rb_{0.1}Zn_2Co_5Fe_2BiMo_{12}O_x$ are employed in the reaction to obtain good yields of aromatic nitriles.

We claim:

1. In the process for preparing an aromatic nitrile or heterocyclic aromatic nitrile by reacting the corresponding methyl-substituted aromatic compound with molecular oxygen or oxygen supplied by the catalyst and ammonia in the presence of a catalyst at a temperature of about 300° to about 500° C., the improvement comprising using a catalyst containing $$Fe_aBi_bMo_cNi_dCo_eQ_fR_gO_x$$

wherein

Q is an alkali metal, an alkaline earth metal, thallium or mixture thereof,

R is boron, phosphorus, arsenic, antimony, tungsten or mixture thereof, wherein $a$ and $b$ are numbers from about 0.1 to about 12, $c$ is a number from about 8 to about 16, $d$, $e$ and $f$ are numbers from 0 to about 10, $g$ is a number of 0 to about 6, and $x$ is a number which satisfies the valence requirements of the other elements.

2. The process of claim 1 wherein $d$ is a number from about 0.1 to about 10.

3. The process of claim 1 wherein $e$ is a number from about 0.1 to about 10.

4. The process of claim 1 wherein $f$ is a number from about 0.1 to about 10.

5. The process of claim 1 wherein $d$, $e$ and $f$ are numbers from about 0.1 to about 10.

6. The process of claim 1 wherein Q is an alkali metal and $f$ is a number from about 0.01 to about 3.

7. The process of claim 6 wherein Q is sodium or potassium.

8. The process of claim 1 wherein R is phosphorus and $g$ is 0.1 to about 3.

9. The process of claim 1 wherein the catalyst is supported on silica.

10. The process of claim 1 wherein the aromatic compound is a carbocyclic aromatic compound.

11. The process of claim 1 wherein the methyl-substituted aromatic compound reacted is a methyl-substituted benzene.

12. The process of claim 1 wherein the methyl-substituted aromatic compound is selected from the group consisting of toluene or a xylene.

References Cited

UNITED STATES PATENTS 3,642,930  2/1972  Grasselli et al. _____ 260—470 X
3,254,110  5/1966  Sennewald et al. ____ 260—465.3

LEWIS GOTTS, Primary Examiner

D. H. TORRENCE, Assistant Examiner

U.S. Cl. X.R.

252—432, 437, 470; 260—283 CN, 294.9, 307 R, 326.62 329 R